United States Patent [19]
Reudink et al.

[11] Patent Number: 5,745,841
[45] Date of Patent: Apr. 28, 1998

[54] SYSTEM AND METHOD FOR CELLULAR BEAM SPECTRUM MANAGEMENT

[75] Inventors: Douglas O. Reudink; Mark Reudink, both of Bellevue, Wash.

[73] Assignee: Metawave Communications Corporation, Redmond, Wash.

[21] Appl. No.: 651,981

[22] Filed: May 20, 1996

[51] Int. Cl.[6] .................................................. H04B 15/00
[52] U.S. Cl. ........................... 455/62; 455/63; 455/67.1; 455/277.2
[58] Field of Search .................... 455/422, 423, 455/424, 450, 452, 62, 63, 67.1, 226.1, 227.1, 227.2, 65, 561, 562

[56] References Cited

U.S. PATENT DOCUMENTS

| | | | |
|---|---|---|---|
| 4,932,049 | 6/1990 | Lee | 379/60 |
| 5,095,535 | 3/1992 | Freeburg | 455/277.1 |
| 5,504,936 | 4/1996 | Lee | 455/33.2 |
| 5,565,873 | 10/1996 | Dean | 342/372 |
| 5,603,082 | 2/1997 | Hamabe | 455/63 |

OTHER PUBLICATIONS

William C. Jakes, "Microwave Mobile Communications," The Institute of Electrical and Electronics Engineers, Inc., 1974, pp. 378–387.

*Primary Examiner*—Amelia Au
*Attorney, Agent, or Firm*—Fulbright & Jaworski L.L.P.

[57] ABSTRACT

A system and method for continuously managing antenna beam assignment for a particular channel in a cell is disclosed. Reception conditions on the antenna beams are continuously monitored whereby wireless communications are initially assigned antenna beams based on reference, in part, to the currently prevailing reception conditions. Antenna beam assignment for continuing wireless communication is periodically updated based reference, in part, to subsequently prevailing reception conditions.

80 Claims, 4 Drawing Sheets

SYSTEM AND METHOD FOR CELLULAR BEAM SPECTRUM MANAGEMENT

RELATED APPLICATIONS

Reference is hereby made to the following five co-pending and commonly assigned U.S. patent applications: APPARATUS, SYSTEMS AND METHOD FOR COMBINING IN WIRELESS COMMUNICATIONS SYSTEMS, Ser. No. 08/488,793; MULTIPLE ANTENNA TRANSMISSION SYSTEM, Ser. No. 08/520,316; SYSTEM AND METHOD FOR FREQUENCY MULTIPLEXING ANTENNA SIGNALS, Ser. No. 08/520,000; METHOD AND APPARATUS FOR IMPROVED CONTROL OVER CELLULAR SYSTEMS, Ser. No. 08/582,525, and CELLULAR SYSTEM SIGNAL CONDITIONER, 08/651,980; the disclosures of which five applications are incorporated herein by reference.

TECHNICAL FIELD OF THE INVENTION

This invention relates to cellular telephony and more particularly to a system and method for allocating antenna beams within an available spectrum in the management of calls in a cellular system.

BACKGROUND OF THE INVENTION

As cellular communications become more widely used, the number of individual users and calls multiplies. Increase in cellular communications utilization magnifies the opportunity for interference between the different users on the cellular system. Such interference is inevitable because of the large number of users and the finite number of cellular communications cells (cells) and frequency bands (channels) available.

As originally implemented, cellular communications systems were broken down into omnitrunks where each cell was able to use each channel in a 360° radius. Because of overlap in the area serviced by cells, a caller utilizing one cell in the penumbra between two cells could interfere with a caller utilizing the other cell if both were on the same channel. To avoid this interference the channel utilized by a caller in one cell would have to be disabled for any other callers in any adjacent cells. Disabling such a channel on all adjacent cells would cause many more cells than actually utilized to have the caller's channel unavailable for use by other callers. Such disabling of channels to avoid interference was recognized to lead to under-utilization of cell resources as well as depletion of available channels.

In order to avoid such under-utilization, reuse patterns were adopted in the art wherein different channel sets are assigned to different cells so that callers in adjacent cells tend not to utilize the same channel concurrently. Problems with such reuse patterns, however, include difficulty in creating a cell reuse pattern utilizing channels in such a way as not to have any two cells' use of a channel overlap, as well as limitations on the number of channels available for use in implementing such a reuse pattern.

To reduce the interference problems caused by other users in the omni cell 360° configuration, cells have also been broken down into 120° sectors such that each channel available at the cell only communicates in an area of 120° radial coverage about the cell. An advantage in addition to the reduction of interference realized by the sector system is that such a cell achieves extended range as compared to an omni cell 360° system simply due to the ability to focus a greater signal gain on the antennas. Individual cells may then cover a larger area, and communications signals may be stronger within the cell.

A problem with going from the omni cell 360° configuration to the sector system, however, is that as a result of splitting of the cell into 120° sectors only a third of the channels are available in each sector. This results in a reduced call capacity in any particular cell sector at a cell as compared to that available in the omni cell 360° configuration. This is because if all of the channels in a particular sector are currently being utilized by users, a channel available in another sector in that same cell may not be available for utilization by a new caller located in the loaded sector. For example, if an omni cell has 60 channels and a sector system is divided into three 120° sectors, each sector only has 20 channels. If in sector 1 there are 20 channels being used and a twenty-first user attempts to gain access, this user will not have access to the cell because of a lack of available channels in the sector. Whereas, in the omni cell 360° configuration the twenty-first user would have had access to the cell because all channels are by definition potentially available.

Another problem is that in a cellular system, communications are typically mobile, often in vehicles travelling at considerable speed. Such mobiles tend to travel through sectors rapidly, thereby requiring channel handoffs as the coverage area of one sector is exited and the coverage area of another is entered. Therefore, although use of sectors may have limited the potential for co-channel interference within a sector, such use has also heightened the complexity of handoff processing.

It would, therefore, be advantageous to make more efficient use of cellular capacity by being able to make all channels potentially available on a plurality of sectors. Ideally, the sector beams will be narrow so as to minimize the potential for co-channel interference. Such a system is described in the above referenced APPARATUS, SYSTEMS AND METHOD FOR COMBINING IN WIRELESS COMMUNICATIONS SYSTEMS and MULTIPLE ANTENNA TRANSMISSION SYSTEM. Management of such a system, including concurrent beam and channel management within a neighborhood of cells, is disclosed in the above referenced METHOD AND APPARATUS FOR IMPROVED CONTROL OVER CELLULAR SYSTEMS.

Recognizing the mobility of communications, however, it would also be advantageous to be able to actively assign beams on a particular channel so as to "follow" the mobile. It will be understood that assigning fixed narrow beams in rotation around an antenna as a mobile moves with respect to the antenna will have the effect of "following" the mobile, especially if beams no longer in proximity to the mobile are subsequently "de-assigned". In this way, the beam coverage assigned to the mobile may be kept narrow, limiting co-channel interference with mobiles on the same channel outside of this coverage area. It would also be advantageous in doing this to disable beams from being assigned to the mobile where potential co-channel interference situations may be detected ahead of time.

The present invention is directed to addressing these beam assignment needs.

SUMMARY OF THE INVENTION

The present invention uses a multiple narrow beam system to address the problems of co-channel interference and channel depletion that attend the 3-sector system in wide use today. Although any number of beams could be used in accordance with the principles of the invention, a preferred embodiment uses 12 such beams. Dynamic beam allocation is utilized in the 12-beam system, resulting in potential coverage for each channel in a 360° radial spectrum throughout the cell as in an omni trunk configuration. The high gain feature of directional antennas is also available. As a result, the present invention allows all channels to be at the disposal of users in the cell, while limiting the potential for co-channel and adjacent channel interference by use of narrow beams.

The present invention assigns beams with reference to predetermined channel beam assignment rules wherein communications quality is monitored and beams are made eligible or ineligible based on a regime of predetermined communications quality considerations. Such communications quality considerations include determination of beams receiving greatest signal strength, and comparing received signal strength in any beam against predefined threshold values. Periodic verification of signal source also forewarns of potential impending co-channel interference situations.

It will thus be appreciated that a technical advantage of the present invention is that all the channels of the cell can be made available throughout the cell. If necessary, the present invention can allocate all channels to one beam, if that is where all the users are found. As a result, an increased number of users may be handled in comparison to the sector system which is in common use today.

A further technical advantage of the present invention is that it tends to remediate co-channel interference over the traditional 3-sector system. The 3-sector system communicates in an entire 120° sector of the radial spectrum and thus is subject to potential co-channel interference in a wide sector. The present invention, in a 12-beam embodiment, communicates in only 30° sectors of the radial spectrum and thus limits the potential co-channel interference. This allows the present invention to achieve better call quality as well as to allow greater use of channels throughout the system, resulting in the ability to handle more call traffic.

A still further technical advantage of the present invention is that the ability to allocate channels to any beam enables the present invention to serve heavily loaded areas efficiently. If the loading changes, for example at different times during the day, the present invention is able to allocate channels to that beam or beams. In contrast, in the 3-sector system, the channels are traditionally not dynamically allocatable and therefore cannot self adjust for differing traffic loads. Each sector system operates a fixed number of allocated channels that remain until a cell technician physically adds more channels to the cell. Such addition of channels may not be done arbitrarily because the added channels may generate interference problems for other sectors or cells. The present invention avoids this problem by being able to allocate channels as required to various beams according to traffic needs.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

The embodiment of the present invention described hereunder assumes an autonomous cellsite with call management decisions made without reference to information regarding call activity in neighboring cells. In this embodiment, it will therefore be understood that the logic of the present invention will advantageously be embodied on intelligence in the cellsite controller.

It will be appreciated by those in this art, however, that the logic of the present invention applies equally well when supplemented by neighborhood data. In such an alternative embodiment, it will be understood that the logic of the present invention would be then embodied in intelligence of the cellsite controller in combination with a host controller managing call activity in a neighborhood of cells, such as is disclosed in above-referenced, co-pending, commonly assigned U.S. patent application METHOD AND APPARATUS FOR IMPROVED CONTROL OVER CELLULAR SYSTEMS.

Within an environment of an autonomous cellsite, therefore, it will be further appreciated that the present invention conducts spectrum management on a per-channel basis. It will therefore be understood that in a typical cellsite environment, the controller will run multiples of the present invention concurrently, one for each channel under the controller's management. In this way, all mobile traffic in the cell under the controller's management may take advantage of the benefits of the present invention.

It will also be understood that the system as described and claimed herein may manage communications prevailing thereon in any one of a number of broadcast signal environments, such as in analog, or in a digital signal Time Division Multiple Access (TDMA) mode environment.

It will be further understood that in the embodiment described in detail herein, the system may manage calls, as required, by allocating radio transmitters keyed to various channels to one or more of 12 antenna beams covering the cell. It will be understood, however, that the present invention is not limited to any specific number of beams, and its logic may apply to operate on any number thereof.

Figure 1:
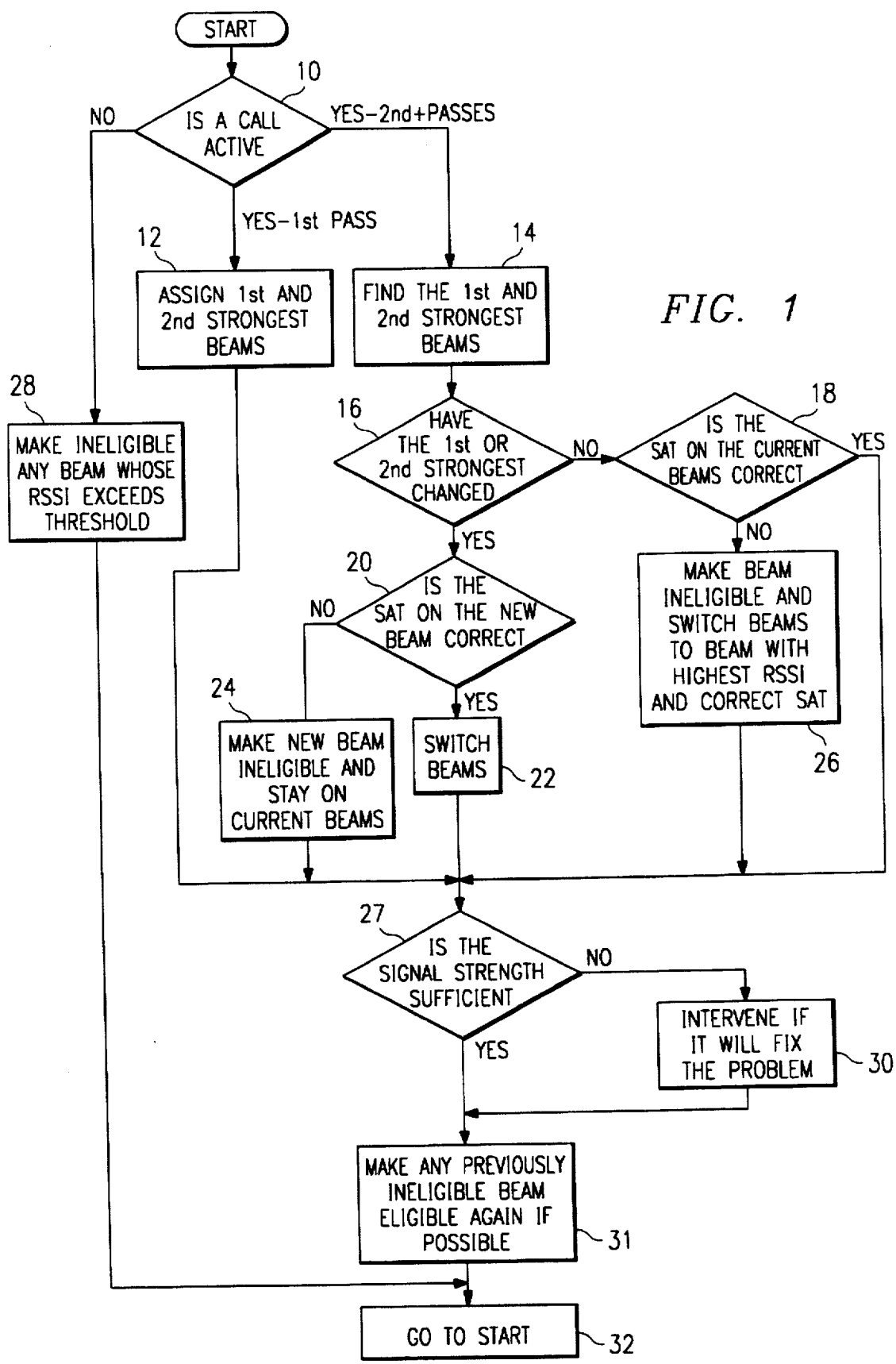
FIG. 1 is a high-level block diagram illustrating the general processing sequence of the present invention.

FIG. 1 is a high level block diagram illustrating the general processing sequence of the present invention. It will be seen that it is first determined whether a call is active for this channel (block 10), and if not, then any beam whose Received Signal Strength Index (RSSI) exceeds a predetermined threshold is made ineligible for future assignment (block 28). This action assumes that the source of such RSSI is very likely to be a potential co-channel interferer. Processing then returns to the start for another cycle (block 32).

If a call is active, and this is the call's first processing cycle, then the beams on which the strongest signals are currently detected (and advantageously the two strongest beams) are assigned to the mobile (block 12). Having assigned beams, it will be understood that the identity signature of those beams are then periodically validated to ensure that the signal being received is actually from the correct mobile that activated the channel. Strong signals received from mobiles with the wrong identity signature will cause the system to make the beams on which those signals are received ineligible.

It will be understood by those in this art that a beam's identity signature may be enabled by any of a variety of methods known in the art, such as Supervisory Audio Tone ("SAT"), Digital Supervisory Audio Tone ("DSAT"), or color code. In the preferred embodiment herein, exemplary use is made of SAT. It will be appreciated, however, that the present invention is not limited to use of SAT as a beam's identity signature, and that the present invention will function equally well using other identifying methods such as described above.

Second and subsequent processing cycles for an active call begin with identification of the strongest beams (block 14). If they are the same as the beams assigned to the call, then processing moves on to an SAT check (blocks 16 and 18). Beams passing the SAT check are left unchanged. Beams failing the SAT check are made ineligible, and the call is assigned to the next strongest beam with correct SAT (block 26).

If, however, in block 16 the strongest beams have changed from the ones assigned to the call, then a beam switch to the strongest beams will be initiated (block 22), subject again to a SAT check (block 20), and making beams carrying signals with incorrect SAT ineligible (block 24).

All processing then goes through a check for low signal strength on the assigned beams against a predetermined absolute standard (block 27). If signal strength is low, intervention may be necessary (block 30), such as beam switch, channel switch, handoff, etc. If signal strength is satisfactory, however, processing continues to check if any beams previously made ineligible may now be made eligible (block 31). Processing then recycles back to the start (block 32).

Figure 2:
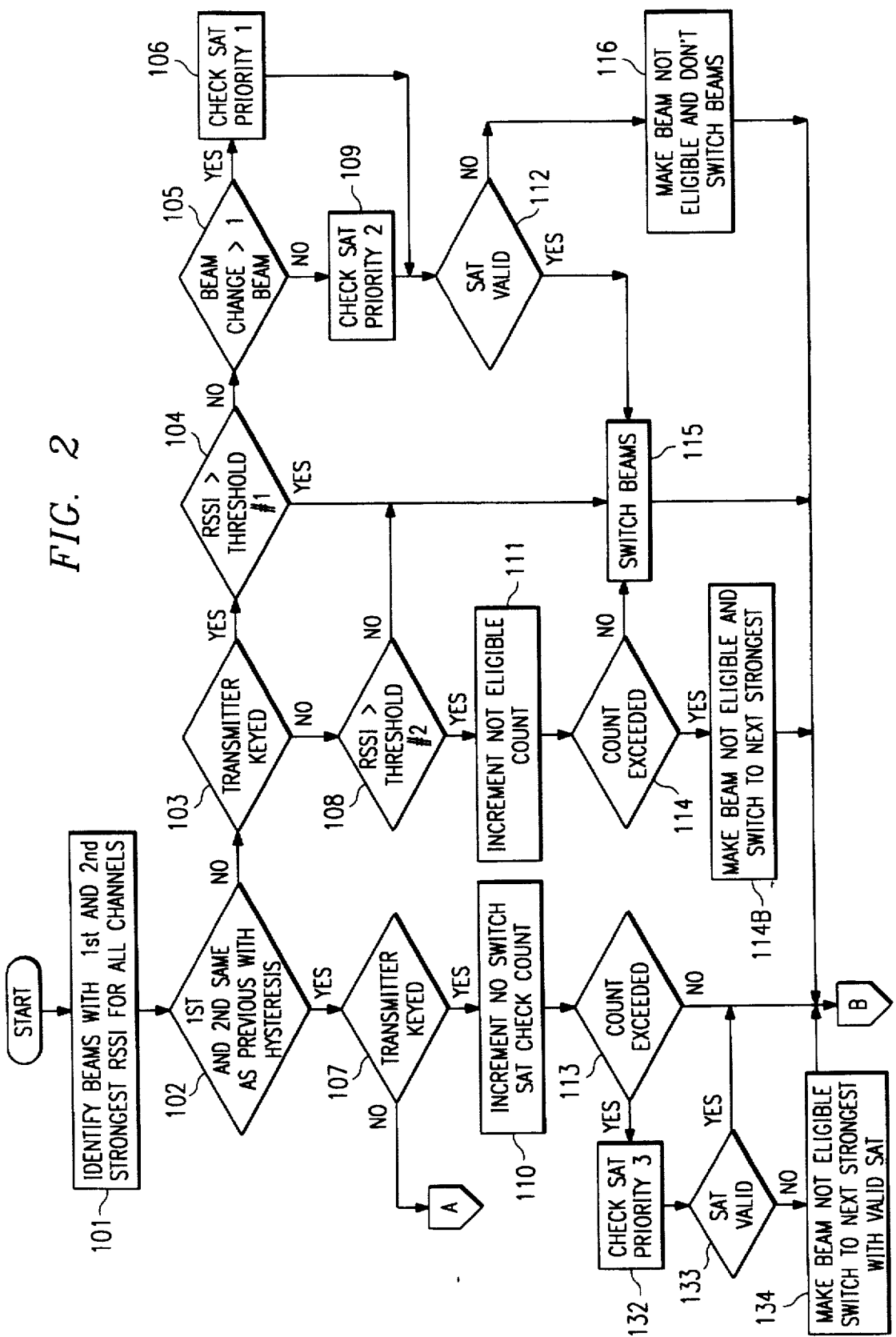
FIG. 2 is a flow chart illustrating the logic of a first part of the present invention.

The logic of the present invention will now be described in more detail. Turning now to FIG. 2, a flow chart is depicted describing processing logic corresponding to block 14, et seq. on FIG. 1. In particular, it is assumed on FIG. 2 that the first pass within FIG. 1 has been accomplished, as illustrated on FIG. 1 commencing with block 12, and second and subsequent passes are now anticipated, as illustrated on FIG. 1 commencing with block 14.

Block 101 on FIG. 2 therefore assumes that the RSSI has previously been determined for all channels within the cell on all 12 beams, and that this information is available to the system. Block 101 on FIG. 2 further assumes that in the first pass, the system assigned the two strongest beams at that time to the activated channel to enable communication thereon. As shown in block 101 on FIG. 2, the beams with the first and second strongest RSSI values for all channels now are reidentified.

It will be noted that in the embodiment described in detail herein, two beams are typically assigned to each call being managed on a particular channel. It will also be understood, however, that the logic and principles of the present invention are not limited to an embodiment in which two beams are assigned. In fact, the present invention applies whether one or more than one beam is assigned.

As a threshold analysis in the embodiment described, therefore, other factors being equal, it will be seen that it is always advantageous to assign the call to the two beams with the RSSI strongest values, so that optimum call quality is more likely to be achieved. It will also be appreciated that is likely that the beams with the two strongest RSSI values are likely to be neighboring beams, although these may not always be the cases depending on prevailing interference conditions.

It will be further understood that initial beam assignment to a call must be made with a minimum of delay so as not to interrupt the call with discernable periods of silence. Adjustments, if necessary, may follow later. Of course, it would be ideal to do the adjustment analysis first and then assign the beams based on the result thereof. It will be understood by those in this art, however, that beams have to be assigned almost instantaneously when a new call keys a transmitter, so as not to interrupt the call in progress. Often, in real time, the adjustment processing may take 250 milliseconds or longer to complete, which would be an unacceptable length of time to suspend a call before assigning beams. Accordingly, the system assigns the beams with the two strongest RSSI values first and then adjusts thereafter as necessary.

Moving to block 102, the system next determines whether the beams with the strongest RSSI identified in block 101 are the same as the beams currently assigned to the call. As noted on block 102, this determination is made taking into account a permitted degree of hysteresis. Advantageously, a new strong beam will not replace an assigned beam unless the new beam's RSSI is a predetermined power level, typically at least 3 dB, stronger than the RSSI of the beam it proposes to replace. This is because there is little technical advantage to switching beams unless the new beam is significantly stronger than the one it replaces.

Assuming that there is no change in the first or second strongest beams in block 102, the system next rechecks to ensure that the transmitter is still keyed before continuing (block 107). Clearly, if the transmitter has gone offline, then further processing as if the call is active would be unnecessary.

Figure 2A:
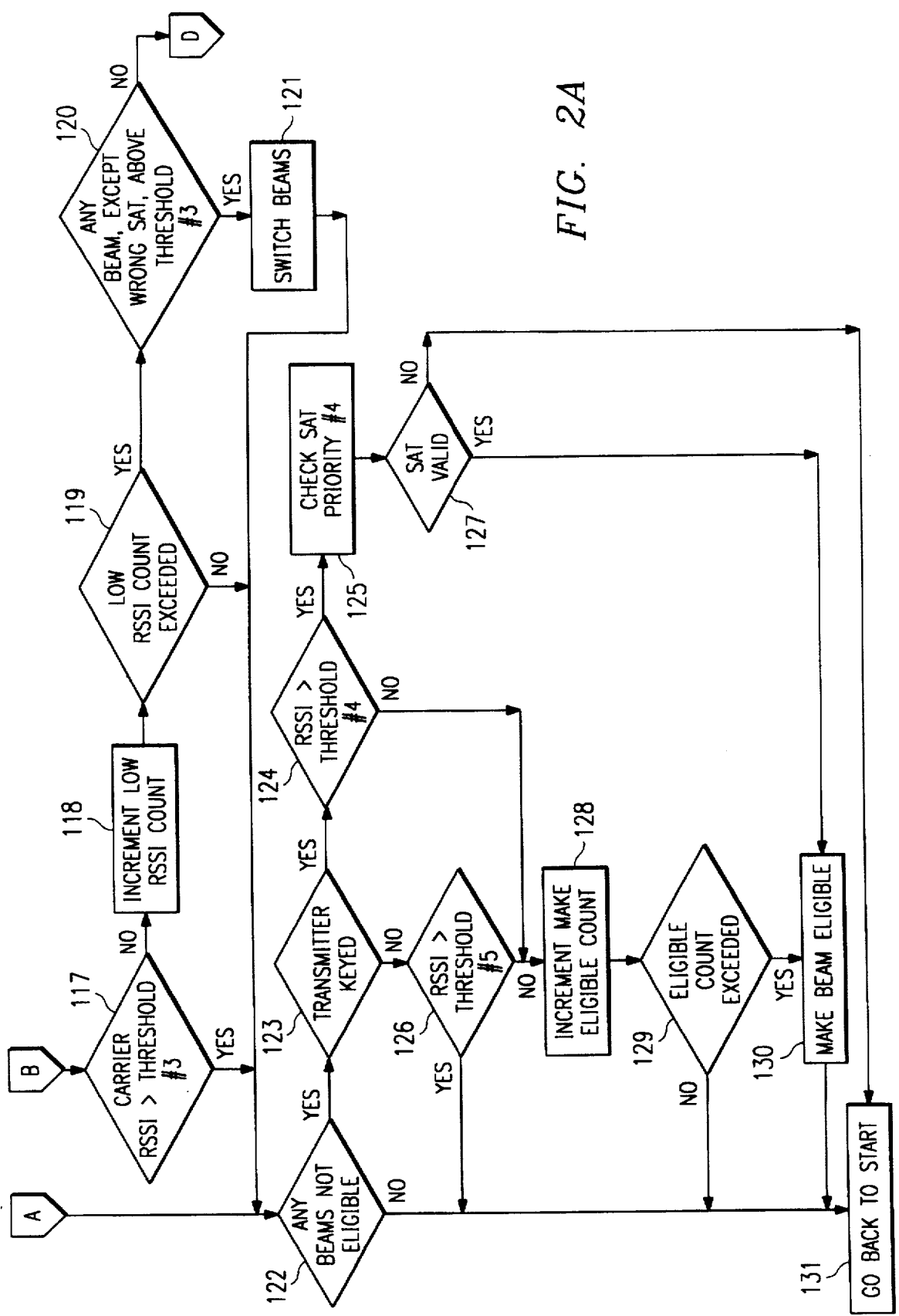
FIG. 2A is a flow chart illustrating the logic of a second part of the present invention.

If the transmitter is no longer keyed in block 107, the system nonetheless continues with processing as set forth in the flow chart illustrated, in part, on FIG. 2A. This processing includes a "Make Eligible" module that, before returning processing to the start to commence another cycle, checks to make sure that any beams determined earlier to be ineligible (as a result of potential interference with another call) still need to blocked. If any are not (for example, the potential interferer may have hung up, moved on, or handed off), then clearly the block on that beam should advantageously be lifted so that the beam may then become available to be assigned to calls being managed.

In the Make Eligible module, therefore, entered at this time after the system has determined at block 107 that it currently has no calls to manage on that channel at this time (i.e. no transmitter keyed), the system first determines whether any beams are currently designated ineligible by earlier processing (block 122). If not, then processing returns to the start for another cycle (block 131).

If, on the other hand, there are beams previously designated ineligible, then the system next, at block 123, re-determines whether a transmitter has been keyed during processing since the last check. Although this may at first appear redundant, it will understood that in approaching any decision as to whether to reinstate a beam as eligible, the logic must have the most up-to-date information available on the status of calls in the cell. Without this, the system might switch a call into a beam in which there was a serious interference problem because that beam was erroneously made available, or permit less-than-optimum call quality to prevail even though a beam on which better transmission would result was available.

Having confirmed in block 123 that a transmitter has not been keyed, then the system then determines, at block 126, whether the RSSI on all currently ineligible beams exceeds a predetermined power threshold (in FIG. 2A, labeled "threshold 5") If it does, then the ineligible status on those beams that exceed threshold 5 are left in place, since the RSSI level detected on these beams infers a presence of a previously-identified potentially interfering signal. Processing is then returned to the start for another cycle (block 131).

On the other hand, for beams where the RSSI does not exceed threshold 5, then a presumption that this beam may be released is begun. The system increments a Make-Eligible counter (block 128). If the count has now reached a predetermined value (i.e. the RSSI for that beam has now not exceeded threshold 5, advantageously about −110 dBm, for a preselected time period, advantageously about 3 seconds), then the beam is reestablished as eligible for possible assignment in the next cycle (block 130). If not, the ineligible block remains, although the counter has been incremented. Processing is then returned to the start for another cycle (block 131).

Returning now to block 123, let it be assumed this time that at the start of the Make Eligible module, the system determines that a transmitter has indeed been keyed. The system's first determination is to see whether the RSSI on any previously ineligible beam exceeds a predetermined value, shown on FIG. 2A as threshold 4. This threshold level may be predetermined to be any value, but advantageously at or near the first or second strongest values previously determined at block 101.

If none of the previously ineligible beams have a sufficiently strong RSSI to exceed threshold 4, then clearly none of these beams would be good initial choices to assign to the call on the keyed transmitter. Processing is therefore run through the Make-Eligible counter subroutine as described above (blocks 128 and 129). If the count is exceeded, the beam is made eligible for future use, and if not, then it remains blocked as ineligible while the Make-Eligible counter has been incremented by one. Either way, processing then returns to the start for another cycle (block 131).

If, on the other hand, a previously ineligible beam shows an RSSI value above threshold 4 at block 124 in response to the newly discovered transmitter being keyed at block 123, then the system performs a Supervisory Audio Tone (SAT) check to make sure that the signals detected on beams whose RSSI exceeds threshold 4 is actually the call that keyed the transmitter (block 125). Although not critical, this SAT checking at block 125 is advantageously done on a priority 4 basis, meaning that other SAT checking elsewhere in the system is done another, often higher priority. For those where SAT is invalid (i.e. the call generating RSSI on the beam(s) is not the one that keyed the transmitter), then those beams remain designated ineligible, since it may be deduced that the RSSI detected at those beams is being caused by a potential interferer. For those beams where the SAT is valid, the beams are made immediately available for assignment in the next cycle (block 130). Processing is then returned to the start for another cycle (block 131).

Returning to block 107 on FIG. 2, let it now be assumed instead that the system detects that a transmitter for this channel in this cell continues to be keyed. Moving on to block 110, therefore, the system next enters a No-Switch-SAT-Check module, which periodically checks to make sure that the strong RSSI signals received on the beams assigned to a call are in fact from the mobile whose call originally keyed the transmitter for this channel in this cell. It will be appreciated that it is possible that while processing is undertaking some other task, a call that was previously under management and assigned a particular beam(s) may go off-line, and in its place another mobile, not under the control of this cellsite, may generate sufficient RSSI on the beam(s) to give the illusion that the original mobile is still there. This means that periodically, advantageously every 3–5 seconds or so, the system checks SAT on the calls in its assigned beams to make sure it is servicing the correct mobile.

With reference to FIG. 2, the No-Switch-SAT-Check module begins at block 110, with the incrementation of a No-Switch-SAT-Check counter. The system then determines if the counter has exceeded a predetermined value (block 113). Again, analogous to the Make Eligible module described above, if the count is exceeded (i.e. processing has completed a sufficient number of cycles for enough time to have elapsed for another periodic SAT check to be done), the system checks the SAT on the signals received at the assigned beams, advantageously but not imperatively on a priority 3 basis (block 132). If the SAT is valid, then the system is servicing the correct call, and no beam adjustment is required. Processing continues to the Low RSSI module as described further below (block 133).

If, on the other hand, the SAT is invalid, the system will have determined that it has assigned a beam where there is a potential interferer generating the strong RSSI detected on the beams assigned to the call. In this case, the beam(s) affected are designated ineligible to be assigned to future calls, and the current call is assigned to the beam(s) with the next strongest RSSI with valid SAT (block 134). Processing continues to the Low RSSI module as described further below.

Processing then continues into the No-Switch-SAT-Check module as for the initial cycle for a call as described above (blocks 110, 113, 132, 133 and 134). Following No-Switch-SAT-Check, processing continues into the Low RSSI module as described further below.

Returning now to block 101 on FIG. 2, let it now be assumed that in block 102 the beams with the 1st and 2nd strongest RSSI levels are not the same as one or both of the two beams currently assigned to the call. In this case, processing continues into the Switch Beams module.

Processing begins at block 103 where the system confirms that a transmitter has still been keyed. Again, analogous to the Make Eligible module described above, it will understood that in approaching any decision as to whether to switch beams, the logic must have the most up-to-date information available on the status of calls in the cell. Without this, the system might switch a call into a new beam in which a strong RSSI was recently detected, when in fact the RSSI was caused by a potential interferer rather than the call currently under management.

If the transmitter is found not to be keyed in block 103, therefore, a potential interference situation may be inferred since the source of the strong RSSI is likely to be a "foreign" mobile. In response, the system next determines whether the RSSI in the new beam(s) is above a predetermined threshold power level (shown on FIG. 2 as threshold 2 in block 108). This threshold level may be predetermined to be any value, but typically will be chosen to be above a level where a call assigned that beam could not co-exist with the interferer, advantageously −110 dBm.

Let it be assumed that the RSSI for the new beam(s) is determined in block 108 not to exceed threshold 2. In other words, the RSSI from the interferer is not likely to affect performance. In this case, it is acceptable for the system to maintain such beam(s) as eligible. The system also switches beams (block 115) so that the beams designated as 1st and 2nd strongest now include this beam. Although it may at first appear counter-intuitive to switch beams into a beam where a potential co-interferer has been recognized, it must be remembered that in order to reach this point in the logic, the transmitter must also be recognized as not keyed. This means that the logic is not currently managing a communication, and so there is no danger of switching a call into potential co-interference at this time. By making this beam switch, however, the logic nonetheless prepares the system to be ready to receive a further communication at some future time. The alternative would be to leave beams unchanged while the transmitter is not keyed, during which time the strongest beams might change, leaving the system identified later to beams that may not necessarily by the strongest available By continuously monitoring and updating even where the transmission is now keyed, however, should a voice call come in before the transmitter is keyed, the call is likely to be initially cleaner, the first and second strongest beams already identified and ready to be connected to a radio.

Let it now be assumed that at block 108, the RSSI for the new beam(s) does exceed threshold 2. Ultimately, the system will want to make such new beam(s) ineligible until the potential interference has gone away. However, the system also recognizes that the strong potentially interfering RSSI detected on this beam may only be temporary. Therefore, it may not necessarily be advantageous to make the beam ineligible immediately.

Accordingly, the system increments a Not-Eligible counter (block 111). The system then determines whether the Not-Eligible count has exceeded a predetermined value, advantageously representing a time period of about 3 seconds, after which time it clearly becomes undesirable to assign future communications to a beam on which there is such persistent noise. The system therefore makes the beam (s) affected ineligible, and switches beams designated to be the first and second strongest to include the next strongest beam (blocks 114 and 114B). Processing then continues into the Low RSSI module as described further below.

If, on the other hand, the Not-Eligible count has not been exceeded in block 114, then the system leaves the beam as potentially eligible pending further monitoring. The system also switches beams (block 115) to prepare the system for the next communication, by updating the designation of first and second strongest beams even though no transmitter is keyed. As described above, this action facilitates making the first and second strongest beams available to be assigned to a radio should a voice call come in before the transmitter is keyed. Processing then continues into the Low RSSI module as described further below.

It will be understood that the Not-Eligible counter may be predetermined to any value to lengthen or shorten the amount of time before a beam is made ineligible by a potential interferer. The time will depend on the number of processing cycles that are allowed through the counter before a beam is made ineligible.

Returning now to block 103 on FIG. 2, let it now be assumed that the system confirms that a transmitter is in fact still keyed upon detection of a change of beam with 1st or 2nd strongest RSSI at block 102. The system next compares the RSSI of the new beam(s) to see if a predetermined threshold RSSI is exceeded, shown in block 104 as threshold 1. Advantageously, the value of threshold 1 is predetermined to be indicative of a mobile that is very close to the antenna, and therefore very unlikely to be a potentially interfering mobile on the same channel in a nearby cell. Typically, threshold 1 may be predetermined to be a value of approximately −60 dBm. In such a case, a SAT check is generally unnecessary before reassigning (switching) beams. Thus, if the new beam(s) exceed threshold 1 in block 104, then the beam(s) may be switched (block 115). Processing then continues into the Low RSSI module as described further below.

If, on the other hand, RSSI of the new beam(s) is less than threshold 1 in block 4, then a SAT check is generally advantageous, to make sure that the strong RSSI experienced on the new beam(s) is not from a potential interferer broadcasting on the same channel in a nearby cell. The system first determines whether the new beam(s) would require a change in more than one beam around in angular rotation (block 105). It will be appreciated that in the event that it would, it is highly likely that the strong RSSI is from another source. This is because a mobile in normal travel through the cellsite will tend strongly to increment new beams one by one, rather than jumping to a position in which one or more beams are skipped. The system therefore checks SAT on RSSI sources more than one beam away on a high priority, and advantageously the highest priority (block 106). If, on the other hand, the new strong beam(s) is only one beam around in angular rotation, the system still checks SAT, but advantageously on a lower, second priority (block 109).

If the SAT is valid (block 112), the beam(s) assigned to the mobile may be switched safely (block 115). If the SAT is not valid, then the beam(s) showing strong RSSI are designated ineligible and no switching of the original beam assignment is made (block 116). Either way, processing then continues into the Low RSSI module as described immediately below.

It will be appreciated that substantially all processing up to this point has led to the Low RSSI module. As described above, this is with the exception of when the system detects that no transmitter has been keyed in block 107, indicating that there are no calls in this cell on this channel to manage at this time, in which case processing goes direct to the Make Eligible module. The Low RSSI module accounts for the fact that radio conditions may have deteriorated on a channel to where call quality is likely to be compromised without intervention.

Turning to FIG. 2A, processing in the Low RSSI module begins at block 117, where the system determines whether the beams to which the call is assigned exceed a predetermined threshold, shown as threshold 3 on block 117. Threshold 3 is predetermined to be a level of RSSI below which call quality is likely to be compromised, again advantageously −110 dBm. If RSSI is determined in block 117 to be above threshold 3, then no further analysis is needed in regard to low RSSI, and so processing continues to the Make Eligible module before returning to the start as described in detail above.

If, however, the system determines in block 117 that RSSI is below threshold 3, then it prepares for intervention. The system nonetheless recognizes that the low RSSI may be temporary, and so immediate intervention may not necessarily be advantageous. Accordingly, the system increments a Low-RSSI counter (block 118). As subsequent cycles increment this counter to a predetermined count (the count chosen to reflect a predetermined time period, typically approximately 3 seconds, to have elapsed), the system then determines whether the predetermined count has been exceeded (block 119). If it has not, then the system does not intervene, pending possible imminent improvement in RSSI. Processing continues to the Make Eligible module before returning to the start as described in detail above.

Once the predetermined Low-RSSI count has been reached, however, the system next determines whether any beam, except for those showing RSSI for sources with the wrong SAT, is available above threshold 3 (block 120). If so, then the assigned beam(s) may be switched to one(s) above threshold 3 (block 121). As above, processing then continues to the Make Eligible module before returning to the start as described in detail above.

Figure 2B:
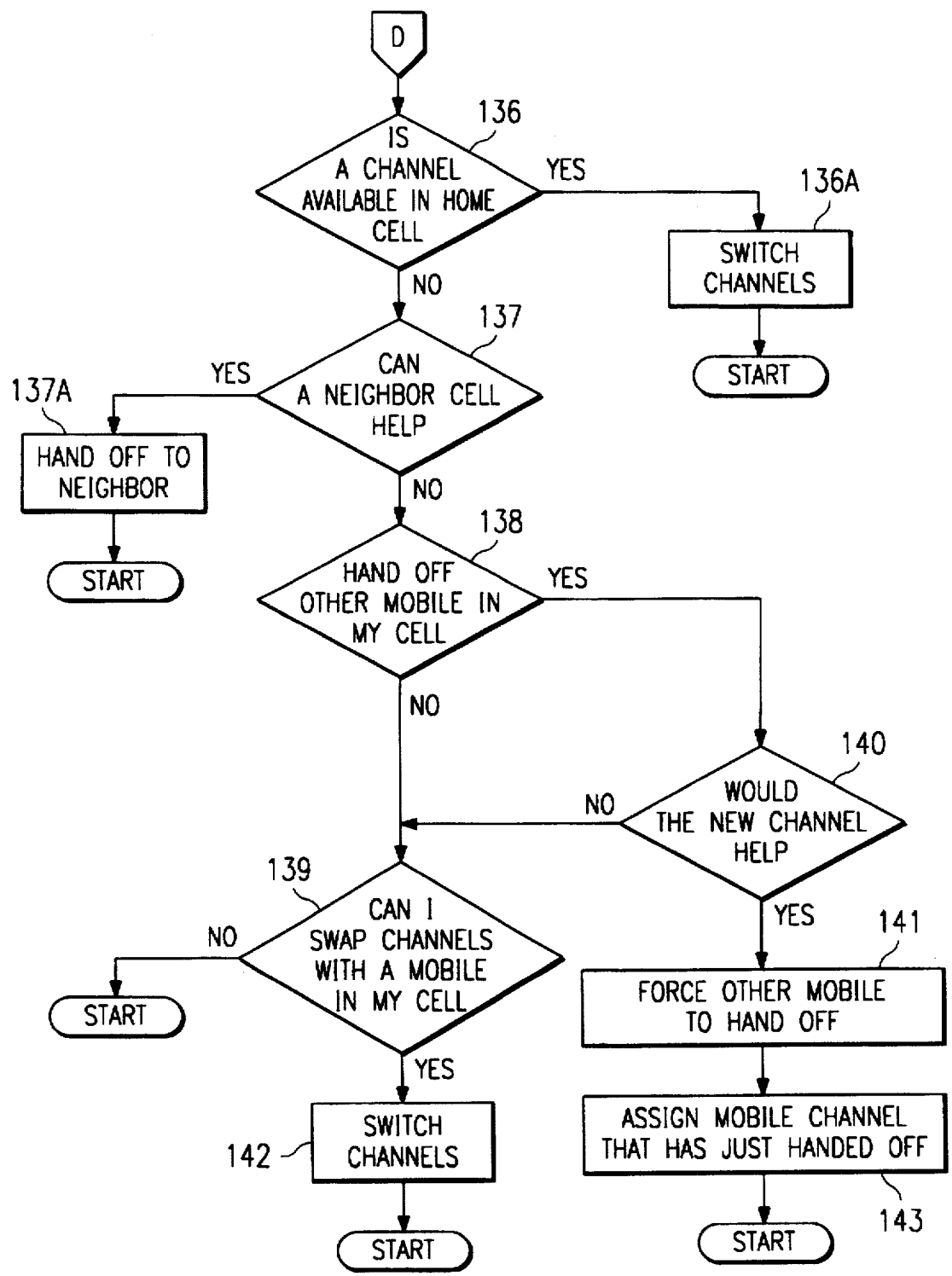
FIG. 2B is a flow chart illustrating the logic of a third part of the logic of the present invention.

On the other hand, if no beam above threshold 3 is available in block 120, then intervention is required. Turning to FIG. 2B, it will be understood that a first remedy is to switch to an available channel in the current cellsite. If a channel is available, then the switch is made and processing returns to the start (blocks 136 and 136A).

If another channel is not available in the current cell, then a second remedy is to hand off to a neighboring cell. If a neighboring cell can help, then the hand off is made and processing returns to the start (blocks 137 and 137A).

If no local channel is available and a neighboring cell cannot help, then a third remedy is to force another mobile in the current cell to hand off to a neighboring cell, and then take the channel vacated by the mobile just handed off. The system first determines if a mobile that could enable such a handoff and channel switch is available (block 138). If one is, before forcing the handoff, the system next determines, in block 140, whether the channel vacated by the mobile handed off will actually help (i.e. RSSI is strong enough). If so, then the hand off and channel switch is made (blocks 141 and 143) and processing returns to the start.

If not, or if another mobile is not available in the current cell to be handed off in block 138, then a fourth remedy is to switch channels with a mobile also in the current cell, advantageously on the opposite side of the cell where it may be unaffected by the interference situation causing intervention on the current channel. The system determines whether a mobile is available to make this switch (block 139). If so, then the channel switch is made (block 142) and processing returns to the start.

If not, then intervention has not been able to help the mobile in trouble. Processing is returned to the start, and the mobile is left to continue at possibly less than optimum call quality, but hopefully not to the point where radio transmission is lost. Processing continues on subsequent cycles during which conditions may change. The system may then attend to the call and improve call quality in response to these changed conditions.

It will also be understood with reference to intervention that the remedies set forth above are not necessarily exclusive, and need not necessarily be evaluated in the precise order described above in detail. Those of skill in this art will understand that intervention remedies may include the four remedies set forth in detail above, which four remedies may be evaluated in other sequences.

It will be further understood by those in this art that the processing logic and intelligence of the present invention may also be embodied on software, executable on a general purpose computer having a processor, a memory, a data storage capacity, and advantageously a display device.

Although the present invention and its advantages have been described in detail, it should be understood that various changes, substitutions and alterations can be made herein without departing from the spirit and scope of the invention as defined by the appended claims.

We claim:

1. A method for continuously managing a plurality of antenna beams to service wireless communications in progress on one channel of a plurality of channels, said method comprising the steps of:

continuously monitoring signal reception conditions on ones of the antenna beams;

detecting commencement of a wireless communication on the channel, said wireless communication thereupon becoming a managed communication;

assigning ones of the antenna beams to the managed communication according to a regime of predetermined beam assignment rules, said regime responsive to currently monitored signal reception conditions in applying said beam assignment rules; and periodically updating said beam assignments in accordance with the regime in light of subsequently monitored signal reception conditions including a comparison of at least one of said subsequently monitored signal reception conditions to a preselected threshold.

2. The method of claim 1, in which the plurality of channels operate in a broadcast signal environment selected from the group consisting of:

(a) digital signal, Time Division Multiple Access (TDMA) mode; and (b) analog signal mode.

3. The method of claim 1, in which the monitoring step includes the substep of periodically measuring received signal strength on ones of the antenna beams.

4. The method of claim 3, in which the regime includes a descending hierarchy of antenna beams arranged in decreasing order of measured received signal strength.

5. The method of claim 4, in which said assigning step includes assigning said ones of the antenna beams in sequence starting with the beam with strongest measured received signal strength and continuing in order of the descending hierarchy.

6. The method of claim 5, in which said updating step includes the substeps of:

periodically comparing the identity of the beams currently assigned to the managed communication with the identity of the current strongest beams in the descending hierarchy; and if necessary, making one or more beam reassignments so as to maintain the current strongest beams in the descending hierarchy assigned to the managed communication, said reassignments thereby identifying replacing beams to be substituted for corresponding replaced beams.

7. The method of claim 6, in which the regime of predetermined beam assignment rules requires that beam reassignments may only be made when the measured received signal strength on the replacing beam exceeds the measured received signal strength on the replaced beam by a preselected amount.

8. The method of claim 7, in which said preselected amount is approximately 3 dB.

9. The method of claim 6, in which said beam reassignment substep further includes the substeps of:

initially verifying that the managed communication has not been terminated; and initially verifying that the measured received signal strength on replacing beams exceeds a first threshold value.

10. The method of claim 9, in which the first threshold value is approximately −60 dBm.

11. The method of claim 9, in which said initial signal strength verification substep includes the substep of:

in cases where the managed communication has not been terminated and for replacing beams whose measured received signal strength does not exceed the first threshold value, verifying prior to beam reassignment that the source of the measured received signal strength on said replacing beams is the managed communication.

12. The method of claim 11, in which said source verification substep is made on a first priority basis for replacing beams whose antenna coverage does not neighbor a beam currently assigned to the managed communication, and is made on a second priority basis for replacing beams whose antenna coverage does neighbor a beam currently assigned to the managed communication.

13. The method of claim 11, in which said source verification substep further includes the substeps of:

replacing beams whose source of received signal strength is determined not to be the managed communication, (a) designating said replacing beams ineligible for any further assignment to the managed communication until designated eligible again, and (b) maintaining the current beam assignments for the managed communication.

14. The method of claim 13, in which said source verification substep further includes the substep of periodically designating eligible again ineligible beams (1) whose source of received signal strength is subsequently verified to be the managed communication, or (2) whose received signal strength falls below a preselected interference threshold for a preselected period of time.

15. The method of claim 14, in which said preselected interference threshold is approximately −110 dBm and said preselected period of time is approximately 3 seconds.

16. The method of claim 9, in which said initial managed communication termination verification substep includes the substep of:

in cases where the managed communication has been terminated, designating ineligible those replacing beams whose measured received signal strength exceeds a second threshold value for a predetermined period of time, said ineligible designation precluding any further assignment to the managed communication until designated eligible again.

17. The method of claim 16, in which the second threshold value is approximately −110 dBm and the predetermined period of time is approximately 3 seconds.

18. The method of claim 16, in which said initial managed communication termination verification substep further includes the substep of periodically designating eligible again ineligible beams (1) whose source of received signal strength is subsequently verified to be the managed communication, or (2) whose received signal strength falls below a preselected interference threshold for a preselected period of time.

19. The method of claim 18, in which said preselected interference threshold is approximately −110 dBm and said preselected period of time is approximately 3 seconds.

20. The method of claim 1, in which the regime of predetermined beam assignment rules requires that any beam assigned to the managed communication whose measured received signal strength falls below a third threshold value for a predetermined period of time be re-assigned to a beam whose measured received signal strength is at least the third threshold value and whose source of measured received signal strength is verified to be the managed communication.

21. The method of claim 20, in which the third threshold value is approximately −110 dBm and the predetermined period of time is approximately 3 seconds.

22. The method of claim 20, further comprising the step of intervening if no replacing beam is available whose measured received signal strength is at least the third threshold value and whose source of measured received signal strength is verified to be the managed communication, said intervening step including one or more actions taken from the group of actions consisting of:

(a) changing the channel to any open channel among said plurality of channels;

(b) handing off the managed communication to be serviced elsewhere;

(c) forcing an alternate wireless communication, said alternate wireless communication being under common channel control and antenna beam control with the managed communication, to be handed off to be serviced elsewhere and then servicing the managed communication in place thereof; and (d) exchanging channels with a switchable wireless communication, said switchable wireless communication being under common channel control and antenna beam control with the managed communication.

23. The method of claim 6, in which said updating step further includes the substep of periodically validating the source of measured received signal strength on beams assigned to the managed communication at times when no beam reassignment is made following said comparing step, said validating substep comprising the substeps of:

(a) initially determining whether the managed communication has been terminated; and (b) if the managed communication has not been terminated, (i) periodically verifying according to a predetermined schedule that the source of the measured received signal strength on beams assigned to the managed communication is the managed communication, and (ii) if said source is not the managed communication, designating ineligible those beams assigned to the managed communication and re-assigning thereto the next strongest beams in the descending hierarchy, said ineligible designation precluding any further beam assignment to the managed communication until designated eligible again.

24. The method of claim 23, in which said predetermined schedule is approximately every 3 seconds.

25. The method of claim 23, in which said validation step further includes the substep of periodically designating eligible again ineligible beams (1) whose source of received signal strength is subsequently verified to be the managed communication, or (2) whose received signal strength falls below a preselected interference threshold for a preselected period of time.

26. The method of claim 25, in which said preselected interference threshold is approximately −110 dBm and said preselected period of time is approximately 3 seconds.

27. A method for continuously managing a plurality of antenna beams to service wireless communications in progress on one channel of a plurality of channels, said method comprising the steps of:

(a) continuously monitoring signal reception conditions on ones of the antenna beams, said monitoring step including the substep of periodically measuring received signal strength on ones of the antenna beams;

(b) detecting commencement of a wireless communication on the channel, said wireless communication thereupon becoming a managed communication;

(c) assigning ones of the antenna beams to the managed communication according to a regime of predetermined beam assignment rules, said regime responsive to currently monitored signal reception conditions in applying said beam assignment rules, said regime including a descending hierarchy of antenna beams arranged in decreasing order of measured received signal strength, said assigning step including assigning said ones of the antenna beams in sequence starting with the beam with strongest measured received signal strength and continuing in order of the descending hierarchy;

(d) periodically updating said beam assignments in accordance with the regime in light of subsequently monitored signal reception conditions, said updating step including the substeps of:
  (i) periodically comparing the identity of the beams currently assigned to the managed communication with the identity of the current strongest beams in the descending hierarchy; and
  (ii) if necessary, making one or more beam reassignments so as to maintain the current strongest beams in the descending hierarchy assigned to the managed communication, said reassignments thereby identifying replacing beams to be substituted for corresponding replaced beams, the regime of predetermined beam assignment rules requiring that beam reassignments may only be made when the measured received signal strength on the replacing beam exceeds the measured received signal strength on the replaced beam by a preselected amount, said beam reassignment substep comprising the substeps of:
    (1) initially determining whether the managed communication has been terminated;
    (2) in cases where the managed communication has been terminated, designating ineligible those replacing beams whose measured received signal strength exceeds a first threshold value for a predetermined period of time, said ineligible designation precluding any further assignment to the managed communication until designated eligible again;
    (3) in cases where the managed communication has not been terminated, verifying that the measured received signal strength on replacing beams exceeds a second threshold value;
    (4) in cases where the managed communication has not been terminated and for replacing beams whose measured received signal strength does not exceed the second threshold value, verifying prior to beam reassignment that the source of the measured received signal strength on said replacing beams is the managed communication, said source verifying substep made on a first priority basis for replacing beams whose antenna coverage does not neighbor a beam currently assigned to the managed communication, and on a second priority basis for replacing beams whose antenna coverage does neighbor a beam currently assigned to the managed communication; and
    (5) for replacing beams whose source of received signal strength is determined not to be the managed communication, (A) designating said replacing beams ineligible for any further assignment to the managed communication until designated eligible again, and (B) maintaining the current beam assignments for the managed communication; and
  (iii) periodically validating the source of measured received signal strength on beams assigned to the managed communication at times when no beam reassignment is made following said comparing step, said validating substep comprising the substeps of:
    (1) initially verifying that the managed communication has been terminated; and
    (2) if the managed communication has not been terminated, (A) periodically verifying according to a predetermined schedule that the source of the measured received signal strength on beams assigned to the managed communication is the managed communication, and (B) if said source is not the managed communication, designating ineligible beams assigned to the managed communication and reassigning thereto the next strongest beams in the descending hierarchy, said ineligible designation precluding any further beam assignment to the managed communication until designated eligible again;

(e) periodically checking beams currently assigned to the managed communication for low signal strength, said checking step including the substep of re-assigning any beam assigned to the managed communication whose measured received signal strength falls below a third threshold value for a predetermined period of time to a replacing beam whose measured received signal strength is at least the third threshold value and whose source of measured received signal strength is verified to be the managed communication, said checking step further including the substep of intervening if no replacing beam is available whose measured received signal strength is at least the third threshold value and whose source of measured received signal strength is verified to be the managed communication, said intervening substep including one or more actions taken from the group of actions consisting of:
  (i) changing the channel to any open channel among said plurality of channels;
  (ii) handing off the managed communication to be serviced elsewhere;
  (iii) forcing an alternate wireless communication, said alternate wireless communication being under common channel control and antenna beam control with the managed communication, to be handed off to be serviced elsewhere and then servicing the managed communication in place thereof; and
  (iv) exchanging channels with a switchable wireless communication, said switchable wireless communication being under common channel control and antenna beam control with the managed communication; and (f) periodically designating eligible again ineligible beams (1) whose source of received signal strength is subsequently verified to be the managed communication, or (2) whose received signal strength falls below a preselected interference threshold for a preselected period of time.

28. The method of claim 27, in which the plurality of channels operate in a broadcast signal environment selected from the group consisting of:
  (a) digital signal, Time Division Multiple Access (TDMA) mode; and (b) analog signal mode.

29. A system for continuously managing a plurality of antenna beams to service wireless communications in progress on one channel of a plurality of channels, said system comprising:

means for continuously monitoring signal reception conditions on ones of the antenna beams;

means for detecting commencement of a wireless communication on the channel, said wireless communication thereupon becoming a managed communication;

means for assigning ones of the antenna beams to the managed communication according to a regime of predetermined beam assignment rules, said regime responsive to currently monitored signal reception conditions in applying said beam assignment rules;

means for designating ones of the antenna beams ineligible for assignment to the managed communication responsive to said currently monitored signal reception conditions, wherein said designating means is operable to designate as ineligible said antenna beams regardless of said currently monitored signal reception conditions being suitable for assignment to the managed communication according to said regime of predetermined beam assignment rules; and means for periodically updating said beam assignments in accordance with the regime in light of subsequently monitored signal reception conditions.

30. The system of claim 29, in which the plurality of channels operate in a broadcast signal environment selected from the group consisting of:

(a) digital signal, Time Division Multiple Access (TDMA) mode; and (b) analog signal mode.

31. The system of claim 29, in which the monitoring step includes the substep of periodically measuring received signal strength on ones of the antenna beams.

32. The system of claim 31, in which the regime includes a descending hierarchy of antenna beams arranged in decreasing order of measured received signal strength.

33. The system of claim 32, in which said means for assigning includes means for assigning said ones of the antenna beams in sequence starting with the beam with strongest measured received signal strength and continuing in order of the descending hierarchy.

34. The system of claim 33, in which said means for updating includes:

means for periodically comparing the identity of the beams currently assigned to the managed communication with the identity of the current strongest beams in the descending hierarchy; and means for one or more beam reassignments, if necessary, so as to maintain the current strongest beams in the descending hierarchy assigned to the managed communication, said reassignments thereby identifying replacing beams to be substituted for corresponding replaced beams.

35. The system of claim 34, in which the regime of predetermined beam assignment rules requires that beam reassignments may only be made when the measured received signal strength on the replacing beam exceeds the measured received signal strength on the replaced beam by a preselected amount.

36. The system of claim 35, in which said preselected amount is approximately 3 dB.

37. The system of claim 34, in which said means for beam reassignment further includes:

means for initially verifying that the managed communication has not been terminated; and means for initially verifying that the measured received signal strength on replacing beams exceeds a first threshold value.

38. The system of claim 37, in which the first threshold value is approximately −60 dBm.

39. The system of claim 37, in which said means for verifying initial signal strength includes:

in cases where the managed communication has not been terminated and for replacing beams whose measured received signal strength does not exceed the first threshold value, means for verifying prior to beam reassignment that the source of the measured received signal strength on said replacing beams is the managed communication.

40. The system of claim 39, in which said means for verifying source operates on a first priority basis with respect to replacing beams whose antenna coverage does not neighbor a beam currently assigned to the managed communication, and on a second priority basis with respect to replacing beams whose antenna coverage does neighbor a beam currently assigned to the managed communication.

41. The system of claim 39, in which said means for verifying source further includes:

in cases where the managed communication has not been terminated and for replacing beams whose source of received signal strength is determined not to be the managed communication, (a) means for designating said replacing beams ineligible for any further assignment to the managed communication until designated eligible again, and (b) means for maintaining the current beam assignments for the managed communication.

42. The system of claim 41, in which said means for verifying source further includes means for periodically designating eligible again ineligible beams (1) whose source of received signal strength is subsequently verified to be the managed communication, or (2) whose received signal strength falls below a preselected interference threshold for a preselected period of time.

43. The system of claim 42, in which said preselected interference threshold is approximately −110 dBm and said preselected period of time is approximately 3 seconds.

44. The system of claim 37, in which said means for verifying initial managed communication termination includes:

in cases where the managed communication has been terminated, means for designating ineligible those replacing beams whose measured received signal strength exceeds a second threshold value for a predetermined period of time, said ineligible designation precluding any further assignment to the managed communication until designated eligible again.

45. The system of claim 44, in which the second threshold value is approximately −110 dBm and the predetermined period of time is approximately 3 seconds.

46. The system of claim 44, in which said means for verifying initial managed communication termination further includes means for periodically designating eligible again ineligible beams (1) whose source of received signal strength is subsequently verified to be the managed communication, or (2) whose received signal strength falls below a preselected interference threshold for a preselected period of time.

47. The system of claim 46, in which said preselected interference threshold is approximately −110 dBm and said preselected period of time is approximately 3 seconds.

48. The system of claim 29, in which the regime of predetermined beam assignment rules requires that any beam assigned to the managed communication whose measured received signal strength falls below a third threshold value for a predetermined period of time be re-assigned to a beam whose measured received signal strength is at least the third threshold value and whose source of measured received signal strength is verified to be the managed communication.

49. The system of claim 48, in which the third threshold value is approximately −110 dBm and the predetermined period of time is approximately 3 seconds.

50. The system of claim 48, further comprising means for intervening if no replacing beam is available whose measured received signal strength is at least the third threshold value and whose source of measured received signal strength is verified to be the managed communication, said means for intervening operating to effect one or more actions taken from the group consisting of:
   (a) changing the channel to any open channel among said plurality of channels;
   (b) handing off the managed communication to be serviced elsewhere;
   (c) forcing an alternate wireless communication, said alternate wireless communication being under common channel control and antenna beam control with the managed communication, to be handed off to be serviced elsewhere and then servicing the managed communication in place thereof; and
   (d) exchanging channels with a switchable wireless communication, said switchable wireless communication being under common channel control and antenna beam control with the managed communication.

51. The system of claim 34, in which said means for updating further includes means for periodically validating the source of measured received signal strength on beams assigned to the managed communication at times when no beam reassignment is made following operation of said means for comparing, said means for validating comprising:
   (a) means for initially determining whether the managed communication has been terminated; and
   (b) if the managed communication has not been terminated,
      (i) means for periodically verifying according to a predetermined schedule that the source of the measured received signal strength on beams assigned to the managed communication is the managed communication, and
      (ii) if said source is not the managed communication, means for designating ineligible those beams assigned to the managed communication and means for reassigning thereto the next strongest beams in the descending hierarchy, said ineligible designation precluding any further beam assignment to the managed communication until designated eligible again.

52. The system of claim 51, in which said predetermined schedule is approximately every 3 seconds.

53. The system of claim 51, in which said means for validating further includes means for periodically designating eligible again ineligible beams (1) whose source of received signal strength is subsequently verified to be the managed communication, or (2) whose received signal strength falls below a preselected interference threshold for a preselected period of time.

54. The system of claim 53, in which said preselected interference threshold is approximately −110 dBm and said preselected period of time is approximately 3 seconds.

55. A computer program product having a computer readable medium on which computer readable logic is recorded for continuously managing a plurality of antenna beams to service wireless communications in progress on one channel of a plurality of channels, said computer program product operable in a computer system having a processor and a memory and a display device, said computer program product comprising:

a computer readable storage medium; and a computer program stored on said storage medium comprising:

means for continuously monitoring signal reception conditions on ones of the antenna beams;

means for detecting commencement of a wireless communication on the channel, said wireless communication thereupon becoming a managed communication;

means for assigning ones of the antenna beams to the managed communication according to a regime of predetermined beam assignment rules, said regime responsive to currently monitored signal reception conditions in applying said beam assignment rules; and means for periodically updating said beam assignments in accordance with the regime in light of subsequently monitored signal reception conditions including a comparison of at least one of said subsequently monitored signal reception conditions to a preselected threshold.

56. The computer program product of claim 55, in which the plurality of channels operate in a broadcast signal environment selected from the group consisting of:
   (a) digital signal, Time Division Multiple Access (TDMA) mode; and
   (b) analog signal mode.

57. The computer program product of claim 55, in which the monitoring step includes the substep of periodically measuring received signal strength on ones of the antenna beams.

58. The computer program product of claim 57, in which the regime includes a descending hierarchy of antenna beams arranged in decreasing order of measured received signal strength.

59. The computer program product of claim 58, in which said means for assigning includes means for assigning said ones of the antenna beams in sequence starting with the beam with strongest measured received signal strength and continuing in order of the descending hierarchy.

60. The computer program product of claim 59, in which said means for updating includes:

means for periodically comparing the identity of the beams currently assigned to the managed communication with the identity of the current strongest beams in the descending hierarchy; and means for one or more beam reassignments, if necessary, so as to maintain the current strongest beams in the descending hierarchy assigned to the managed communication, said reassignments thereby identifying replacing beams to be substituted for corresponding replaced beams.

61. The computer program product of claim 60, in which the regime of predetermined beam assignment rules requires that beam reassignments may only be made when the measured received signal strength on the replacing beam exceeds the measured received signal strength on the replaced beam by a preselected amount.

62. The computer program product of claim 61, in which said preselected amount is approximately 3 dB.

63. The computer program product of claim 60, in which said means for beam reassignment further includes:

means for initially verifying that the managed communication has not been terminated; and means for initially verifying that the measured received signal strength on replacing beams exceeds a first threshold value.

64. The computer program product of claim 63, in which the first threshold value is approximately −60 dBm.

65. The computer program product of claim 63, in which said means for verifying initial signal strength includes:

in cases where the managed communication has not been terminated and for replacing beams whose measured received signal strength does not exceed the first threshold value, means for verifying prior to beam reassignment that the source of the measured received signal strength on said replacing beams is the managed communication.

66. The computer program product of claim 65, in which said means for verifying source operates on a first priority basis with respect to replacing beams whose antenna coverage does not neighbor a beam currently assigned to the managed communication, and on a second priority basis with respect to replacing beams whose antenna coverage does neighbor a beam currently assigned to the managed communication.

67. The computer program product of claim 65, in which said means for verifying source further includes:

for replacing beams whose source of received signal strength is determined not to be the managed communication, (a) means for designating said replacing beams ineligible for any further assignment to the managed communication until designated eligible again, and (b) means for maintaining the current beam assignments for the managed communication.

68. The computer program product of claim 67, in which said means for verifying source further includes means for periodically designating eligible again ineligible beams (1) whose source of received signal strength is subsequently verified to be the managed communication, or (2) whose received signal strength falls below a preselected interference threshold for a preselected period of time.

69. The computer program product of claim 68, in which said preselected interference threshold is approximately −110 dBm and said preselected period of time is approximately 3 seconds.

70. The computer program product of claim 63, in which said means for verifying initial managed communication termination includes:

in cases where the managed communication has been terminated, means for designating ineligible those replacing beams whose measured received signal strength exceeds a second threshold value for a predetermined period of time, said ineligible designation precluding any further assignment to the managed communication until designated eligible again.

71. The computer program product of claim 70, in which the second threshold value is approximately −110 dBm and the predetermined period of time is approximately 3 seconds.

72. The computer program product of claim 70, in which said means for verifying initial managed communication termination further includes means for periodically designating eligible again ineligible beams (1) whose source of received signal strength is subsequently verified to be the managed communication, or (2) whose received signal strength falls below a preselected interference threshold for a preselected period of time.

73. The computer program product of claim 72, in which said preselected interference threshold is approximately −110 dBm and said preselected period of time is approximately 3 seconds.

74. The computer program product of claim 55, in which the regime of predetermined beam assignment rules requires that any beam assigned to the managed communication whose measured received signal strength falls below a third threshold value for a predetermined period of time be re-assigned to a beam whose measured received signal strength is at least the third threshold value and whose source of measured received signal strength is verified to be the managed communication.

75. The computer program product of claim 74, in which the third threshold value is approximately −110 dBm and the predetermined period of time is approximately 3 seconds.

76. The computer program product of claim 74, further comprising means for intervening if no replacing beam is available whose measured received signal strength is at least the third threshold value and whose source of measured received signal strength is verified to be the managed communication, said means for intervening operating to effect one or more actions taken from the group consisting of:

(a) changing the channel to any open channel among said plurality of channels;

(b) handing off the managed communication to be serviced elsewhere;

(c) forcing an alternate wireless communication, said alternate wireless communication being under common channel control and antenna beam control with the managed communication, to be handed off to be serviced elsewhere and then servicing the managed communication in place thereof; and (d) exchanging channels with a switchable wireless communication, said switchable wireless communication being under common channel control and antenna beam control with the managed communication.

77. The computer program product of claim 60, in which said means for updating further includes means for periodically validating the source of measured received signal strength on beams assigned to the managed communication at times when no beam reassignment is made following operation of said means for comparing, said means for validating comprising:

(a) means for initially determining whether the managed communication has been terminated; and (b) if the managed communication has not been terminated, (i) means for periodically verifying according to a predetermined schedule that the source of the measured received signal strength on beams assigned to the managed communication is the managed communication, and (ii) if said source is not the managed communication, means for designating ineligible those beams assigned to the managed communication and means for reassigning thereto the next strongest beams in the descending hierarchy, said ineligible designation precluding any further beam assignment to the managed communication until designated eligible again.

78. The computer program product of claim 77, in which said predetermined schedule is approximately every 3 seconds.

79. The computer program product of claim 77, in which said means for validating further includes means for periodically designating eligible again ineligible beams (1) whose source of received signal strength is subsequently verified to be the managed communication, or (2) whose received signal strength falls below a preselected interference threshold for a preselected period of time.

80. The computer program product of claim 79, in which said preselected interference threshold is approximately −110 dBm and said preselected period of time is approximately 3 seconds.

* * * * *

UNITED STATES PATENT AND TRADEMARK OFFICE
Certificate

Patent No. 5,745,841                                                                                                          Patented: April 28, 1998

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Douglas O. Reudink, Kirkland, WA (US); Mark Reudink, Seattle, WA (US); and Sheldon Meredith, Redmond, WA (US).

Signed and Sealed this Twenty-Second Day of September 2009.

MATTHEW D. ANDERSON
*Supervisory Patent Examiner*
Art Unit 2618